United States Patent
Sommese et al.

(10) Patent No.: US 6,610,209 B1
(45) Date of Patent: Aug. 26, 2003

(54) USE OF POLYMERS CONTAINING VINYLAMINE/VINYLFORMAMIDE FOR THE TREATMENT OF FOOD PROCESSING WASTEWATER

(75) Inventors: Anthony G. Sommese, Aurora, IL (US); Daniel K. Chung, Burlington (CA)

(73) Assignee: Ondeo Nalco Company, Naperville, IL (US)

( * ) Notice: Subject to any disclaimer, the term of this patent is extended or adjusted under 35 U.S.C. 154(b) by 0 days.

(21) Appl. No.: 09/899,675

(22) Filed: Jul. 5, 2001

(Under 37 CFR 1.47)

Related U.S. Application Data

(63) Continuation-in-part of application No. 08/364,589, filed on Dec. 27, 1994, now Pat. No. 6,280,631.

(51) Int. Cl.⁷ .................................................. C02F 1/56
(52) U.S. Cl. ..................... 210/705; 210/727; 210/733; 210/734; 210/735
(58) Field of Search ................................ 210/705, 725, 210/727, 728, 733, 734, 735, 736, 904

(56) References Cited

U.S. PATENT DOCUMENTS

| | | | | |
|---|---|---|---|---|
| 3,715,336 A | | 2/1973 | Nowak et al. ............... | 210/735 |
| 4,013,555 A | | 3/1977 | Davis .......................... | 210/725 |
| 4,421,602 A | * | 12/1983 | Brunnmueller et al. .. | 162/168.2 |
| 4,444,667 A | | 4/1984 | Burkert et al. ............... | 210/735 |
| 5,174,903 A | | 12/1992 | Miller ......................... | 210/725 |
| 5,185,083 A | | 2/1993 | Smigo et al. ................ | 210/735 |
| 5,204,007 A | | 4/1993 | Mosley et al. .............. | 210/705 |
| 5,225,088 A | | 7/1993 | Moench et al. ............. | 210/734 |
| 5,269,939 A | * | 12/1993 | Laurent et al. .............. | 210/705 |
| 5,292,441 A | | 3/1994 | Chen et al. .................. | 210/735 |
| 5,324,792 A | | 6/1994 | Ford ........................... | 525/378 |
| 5,429,749 A | | 7/1995 | Chung et al. ................ | 210/727 |
| 5,435,921 A | | 7/1995 | Collins et al. ............... | 210/727 |
| 5,441,649 A | | 8/1995 | Sommese et al. ........... | 210/735 |
| 5,451,326 A | | 9/1995 | Carlson et al. .............. | 210/708 |
| 5,476,594 A | | 12/1995 | Collins et al. ............... | 210/734 |
| 5,695,647 A | * | 12/1997 | Carbonell et al. ........... | 210/724 |
| 6,280,631 B1 | | 8/2001 | Sommese et al. ........... | 210/734 |

* cited by examiner

*Primary Examiner*—Peter A. Hruskoci
(74) *Attorney, Agent, or Firm*—Michael B. Martin; Thomas M. Breininger

(57) ABSTRACT

A method for clarifying food processing waste water containing suspended solids comprising (iii) adding to the waste water with an effective amount of at least one vinylamine polymer having a molecular weight of at least 10,000, wherein the polymer is prepared by first polymerizing N-vinylformamide and, optionally, vinyl acetate to form a vinylformamide polymer or a vinylformamide/vinylacetate copolymer and then subjecting the vinyl formamide polymer or vinylformamide/vinylacetate copolymer to acid or base hydrolysis to form a vinylamine/vinylformaide copolymer, a vinylamine homopolymer or a up vinylamine/vinylalcohol copolymer;

(ii) coagulating and flocculating the suspended solids; and (iii) separating the coagulated and flocculated suspended solids from the wastewater.

13 Claims, No Drawings

USE OF POLYMERS CONTAINING VINYLAMINE/VINYLFORMAMIDE FOR THE TREATMENT OF FOOD PROCESSING WASTEWATER

CROSS REFERENCE TO RELATED APPLICATIONS

This is a continuation-in-part of U.S. Ser. No. 08/364,589, filed Dec. 27, 1994, now U.S. Pat. No. 6,280,631.

TECHNICAL FIELD

The present invention relates generally to the treatment of food processing wastewater. More particularly, the present invention provides a chemical treatment method that effectively removes fat, blood, tissue and other solids from food processing wastewater.

BACKGROUND OF THE INVENTION

Everyday the food processing industry produces many tons of food processing waste. Such food processing waste contaminates the water stream flowing through the food processing system. For example, poultry farm waste water effluents are enriched with fat, oil, blood and other solids from the poultry process. These by-products, such as fat, blood, and tissue, are typically present in the waste water in a range of several hundred to tens of thousands of ppm.

For economic as well as regulatory reasons, the food processing community faces never-ending concerns regarding the disposal and recycling of food processing waste water. The removal of such by-products is critical from an environmental standpoint. In fact, the United States Environmental Protection Agency has placed tight restrictions on total oil and solids content in water that is be discharged into public drinking water supplies or into open bodies of water.

The removal of such solids is also critical to the established discharge limits for total dissolved solids (TDS), chemical oxygen demand (COD), biological oxygen demand (BOD) and total organic carbon (TOC) into local sewers and rivers. In addition to the EPA's severe discharge limits, food processing industries must also be concerned with local city ordinances.

As an alternative to discharging treated water into a water stream or the like, recycling of the water back into the processing system provides a cost efficient system. However, in order to recycle such waste water, the solids content and so forth must be effectively removed in order to provide pure water back into the system. Accordingly, the same concerns that are present with respect to the removal of such solids for EPA standards exist for recycling purposes as well.

Therefore, a need exists for a treatment system that addresses all the environmental concerns presented by food processing waste, while at the same time being environmentally friendly.

SUMMARY OF THE INVENTION

The present invention provides a method for conditioning food processing waste prior to dewatering with the use of environmentally friendly coagulants and flocculants. Accordingly, in its principal aspect, this invention is directed to a method for clarifying food processing waste water containing suspended solids comprising (i) adding to the waste water with an effective amount of at least one vinylamine polymer having a molecular weight of at least 10,000, wherein the polymer is prepared by first polymerizing N-vinylformamide and, optionally, vinyl acetate to form a vinylformamide polymer or a vinylformamide/vinylacetate copolymer and then subjecting the vinyl formamide polymer or vinylformamide/vinylacetate copolymer to acid or base hydrolysis to form a vinylamine/vinylformamide copolymer, a vinylamine homopolymer or a vinylamine/vinylalcohol copolymer;

(ii) coagulating and flocculating the suspended solids; and (iii) separating the coagulated and flocculated suspended solids from the wastewater.

DETAILED DESCRIPTION OF THE INVENTION

The present invention provides, for conditioning food processing waste, a method that includes the addition of a vinylamine polymer coagulant to the food processing waste. The invention provides a superior method for removing fat, blood, tissue, and the like from food processing waste. The vinylamine polymers of the present invention have been discovered to be more effective in removing such products from food processing waste.

Processes for making the polymers of the invention are described in U.S. Pat. Nos. 5,126,395, 5,037,927, 4,952,656, 4,921,621, 4,880,497 and 4,441,602. Solution polymerization produces the desired molecular weight dosage.

The resulting vinylformamide homopolymers or vinylformamide/vinyl alcohol copolymers are susceptible to alkaline or acid hydrolysis which converts some or all of the amide groups to amine groups. Hydrolysis of the amide groups to yield the amine can be achieved by using acid or base. By controlling the stoichiometry of the hydrolyzing agent it is possible to produce vinylamine/vinylformamide copolymers of varying composition. If vinylformamide is polymerized with other ethylenically unsaturated monomers, then hydrolyzed, it is conceivable that the polymer produced will contain at least three and possibly more functional groups. Cyclic amidine is produced by ammonia or amine hydrolysis of polyvinylformamide.

Preferably, the vinylamine polymers of the invention have an average molecular weight of from about 10,000 to 3,000,000. More preferably, the molecular weight is from about 20,000 to about 2,000,000.

In a preferred aspect of this invention, the molecular weight of the vinylamine polymer is at least 20,000.

In another preferred aspect, the vinylamine polymer is vinylamine homopolymer.

In another preferred aspect, the vinylamine polymer is vinylamine/vinyl alcohol copolymer or vinylamine/vinylformamide copolymer containing from about 1 to about 99 mole percent vinylamine and from about 99 to about 1 mole percent vinyl alcohol or N-vinylformamide.

In another preferred aspect, the vinylamine polymer is vinylamine/vinylformamide copolymer containing from about 2 to about 50 mole percent vinylamine and from about 98 to about 50 mole percent vinylformamide.

In another preferred aspect, the vinylamine polymer is vinylamine/vinyl alcohol copolymer containing from about 2 to about 90 mole percent vinyl alcohol and from about 98 to about 10 mole percent vinylamine.

Pursuant to this invention, food processing waste is purified and an environmentally friendly water is simultaneously obtained. While the sole addition of the polymer coagulant effectively conditions the food processing waste prior to mechanical dewatering, the combined addition of a coagulant and flocculant provides a more complete treatment.

The flocculant component of the treatment leads to the direct agglomeration of colloidal organic solids to suspended solids. The active flocculant increases the settlement rate and facilitates flocculation. In addition, the flocculant component promotes co-precipitation of dissolved solids onto the suspended solids template, reducing soluble biological and chemical oxidation demands of the final treated effluent.

Accordingly, in another preferred aspect, a polymeric flocculant selected from the group consisting of copolymers of acrylamide and esters, amides and nitriles of (meth) acrylic acid, dimethylaminoethylacrylate methyl chloride quaternary ammonium salt, dimethylaminoethylmethacrylate methyl chloride quaternary ammonium salt, sodium 2-acrylamido-2methylpropanesulfonic acid salt, diallyldimethyl ammonium chloride, vinyl pyrrolidone and vinylsulfonate and homopolymers selected from the group consisting of polyacrylamide, polyvinylpyrrolidone, polyvinylpyridine polyvinylpyridine, polyacrylic acid, polymeric 2-acrylamido-2-methylpropanesulfonic acid, polymeric dimethylaminoethylacrylate methyl chloride quaternary ammonium salt and polymeric dimethylaminoetbylmethacrylate methyl chloride quaternary ammonium salt is added to the food processing waste.

Preferred flocculants include poly(acrylamide/sodium acrylate) and poly(sodium acrylate).

The flocculant component of the present invention is added in an effective amount of from about 0.01 to about 1,000 ppm.

The optimal amounts of the various components required for effectiveness in this invention depend on the type of food processing waste being treated. In addition, the concentration of the combined components varies greatly and can depend upon the conditions such as temperature, pH and the amount of suspended solids the food processing waste.

In a preferred aspect, the effective amount of the vinylamine polymer is from about 0.001 to about 1000 parts per million of the wastewater treated.

In another preferred aspect, the effective amount of the vinylamine polymer is from about 0.01 to about 500 parts per million.

In another preferred aspect, the effective amount of the vinylamine polymer is from about 1 to about 250 parts per million.

In another preferred aspect, the separating is carried out by dissolved air flotaion.

In another preferred aspect, the separating is carried out by using a clarifier.

In another preferred aspect, the separating is carried out by mechanical dewatering using a belt press.

In another preferred aspect, the separating is carried out by mechanical dewatering using a plate and frame press.

In another preferred aspect, the waste water is selected from the group consisting of poultry, pork, beef and grain effluent waters.

The vinylamine coagulants of the present invention can be applied to food processing waste slurry, stored or screened solids, or to filtrate produced by dewatering. In an embodiment, the polymer is directly injected into the food processing waste. The polymer may be added with or without a dilution system. The polymers of the invention are preferably added to the system in neat form since they are water-based. However, in some applications, the polymers can be added as an aqueous solution. The active polymer facilitates optimal dewatering of solids as well as optimal clarification of filtrate liquors.

Once the polymers of the invention are added to the waste water stream, the treated water is naturally agitated as it moves through the process stream of the food processing plant. The polymers of the invention will cause the fat, blood, tissue and the like to coagulate from the water. The coagulant is subsequently flocculated and removed from the surface of the water and handled further. The treated water can now be discharged either into a river, lake or recycled into an industrial process.

The results for each set of testing are discussed individually below in respective examples. The chemical treating agents are added at the listed dosages. All Nalco designated products are available from ONDEO Nalco Company, Naperville, Ill. Other commercial products are available as designated.

The foregoing may be better understood by reference to the following Examples, which are presented for purposes of illustration and are not intended to limit the scope of this invention.

EXAMPLE 1

Preparation of Polyvinylamine having a Molecular Weight of about 21,000

Polyvinylamine is made from the precipitation polymerization of N-Vinylformamide (NVF) in a mixture of isopropyl alcohol/acetone. The water soluble monomer is dissolved in the isopropylalcohol/acetone solvent, and polymerization is initiated. The formed polymer precipitates from the solution. The solid is collected and dried. Molecular weight analysis is conducted using GPC (Gel Phase Chromatography) and compared against starch standards. The molecular weight of the poly-NVF is 21,000. The powder is then hydrolyzed to polyvinylamine using a 2-fold excess of NaOH and refluxing the aqueous solution for 4 hours. This resulting solution of polyvinylamine (PVA) is diluted to 1% actives for testing and adjusted to pH 7.

Bench Testing

Bench testing of the representative food processing waste waters shown in Examples 2–6 is performed as follows.

250 ml of wastewater in a 400 ml beaker is dosed with coagulant and stirred for 1.5 minutes at 300 rpm. Then, the flocculant is added in one portion and stirred at 300 rpm for 30 seconds. The stirring rate is reduced to 25 rpm and the solution stirred for 2 minutes. After stirring, the solution is allowed to stand for 2 minutes, then an aliquot is removed and its turbidity measured. Turbidity is an effective measure for insoluble BOD removal.

In Examples 2–6, the polymeric coagulants tested are as follows:

| | | |
|---|---|---|
| A. | EPI-DMA 300–500K | |
| B. | Polyvinylamine; | MW 300,000–500,000 |
| C. | Polyvinylamine; | MW 800,000–2,000,000 |
| D. | Vinylamine/vinylformamide 50/50; | MW 800,000–2,000,000 |
| E. | Vinylamine/vinylformamide 30/70; | MW 800,000–2,000,000 |
| F. | 12/88 Vinylamine/vinylalcohol; | MW 100,000–200,000 |
| I. | Polyvinylamine; | MW 21,000 |

In Examples 2–6, the polymeric flocculants tested are as follows:

| | | |
|---|---|---|
| G. | Acrylamide/Sodium acrylate; | RSV 20–35 |
| H. | Sodium polyacrylate; | RSV 20–35 |

EXAMPLE 2

MIDWESTERN CHICKEN PROCESSING FACILITY

Initial Turbidity>1000 NTU

| COAGULANT (ppm) | FLOCCULANT (ppm) | TURBIDITY (NTU) |
|---|---|---|
| A | G | |
| 4 | 12 | 72.7 |
| 8 | 12 | 27.7 |
| 16 | 12 | 15.7 |
| 20 | 12 | 14.0 |
| 40 | 12 | 57.0 |
| 60 | 12 | 89.0 |
| B | H | |
| 20 | 16 | 410 |
| 40 | 16 | 364 |
| 60 | 16 | 358 |
| 80 | 16 | 313 |
| C | H | |
| 4 | 12 | 80.0 |
| 8 | 12 | 44.0 |
| 16 | 12 | 35.0 |
| 20 | 12 | 10.0 |
| 40 | 12 | 38.0 |
| 60 | 12 | 63.0 |
| D | H | |
| 4 | 12 | 84.0 |
| 8 | 12 | 53.0 |
| 16 | 12 | 33.0 |
| 20 | 12 | 40.0 |
| 30 | 12 | 71.0 |
| 40 | 12 | 196.0 |

In all cases the polymer package produced flocs that are readily floated in a DAF unit.

EXAMPLE 3

A SOUTHEASTERN HOG PROCESSING FACILITY

Initial Turbidity>1000 NTU

| COAGULANT (ppm) | FLOCCULANT (ppm) | TURBIDITY (NTU) |
|---|---|---|
| B | H | |
| 25 | 12.5 | 122.0 |
| 75 | 12.5 | 184.0 |
| C | H | |
| 25 | 12.5 | 32.9 |
| 50 | 12.5 | 33.9 |
| 75 | 12.5 | 39.1 |
| E | H | |
| 25 | 12.5 | 39.0 |
| 50 | 12.5 | 25.3 |
| 75 | 12.5 | 80.6 |
| F | H | |
| 25 | 12.5 | 181.0 |
| 75 | 12.5 | 113.0 |

EXAMPLE 4

MIDWESTERN BEEF PROCESSING FACILITY

Initial Turbidity>1000 NTU

| COAGULANT (ppm) | FLOCCULANT (ppm) | TURBIDITY (NTU) |
|---|---|---|
| B | H | |
| 25 | 12.5 | 141.0 |
| 50 | 12.5 | 126.0 |
| 75 | 12.5 | 118.0 |

EXAMPLE 5

MIDWESTERN GRAIN PROCESSING FACILITY

Initial Turbidity>1000 NTU

| COAGULANT (ppm) | FLOCCULANT (ppm) | TURBIDITY (NTU) |
|---|---|---|
| B | | |
| 10 | 0 | 33.5 |
| 30 | 0 | 34.8 |
| 50 | 0 | 29.1 |
| C | | |
| 10 | 0 | 35.5 |
| 30 | 0 | 24.0 |
| 50 | 0 | 27.0 |
| C | H | |
| 10 | 12.5 | 27.9 |
| 50 | 12.5 | 23.2 |
| F | | |
| 10 | 0 | 25.0 |
| 30 | 0 | 27.4 |
| 50 | 0 | 33.0 |

EXAMPLE 6

A MIDWESTERN GRAIN PROCESSING FACILITY

Initial Turbidity>1000 NTU

| COAGULANT (ppm) | FLOCCULANT (ppm) | TURBIDITY (NTU) |
|---|---|---|
| I | | |
| 50 | H 25 | 67 |
| 100 | H 25 | 30 |
| 150 | H 25 | 11 |
| 0 | H 25 | >1000 |

We claim:

1. A method for clarifying grain processing waste water containing suspended solids comprising
   (i) adding to the waste water an effective amount of at least one vinylamine polymer having a molecular weight of at least 20,000, wherein the polymer is prepared by first polymerizing N-vinylformamide and, optionally, vinyl acetate to form a vinylformamide polymer or a vinylformamide/vinylacetate copolymer and then subjecting the vinyl formamide polymer or vinylformamide/vinylacetate copolymer to acid or base hydrolysis to form a vinylamine/vinylformamide copolymer, a vinylamine homopolymer or a vinylamine/vinylalcohol copolymer;
   (ii) coagulating and flocculating the suspended solids; and
   (iii) separating the coagulated and flocculated suspended solids from the wastewater.

2. The method of claim 1 wherein the vinylamine polymer is vinylamine homopolymer.

3. The method of claim 1 wherein the vinylamine polymer is vinylamine/vinyl alcohol copolymer or vinylamine/vinylformamide copolymer containing from about 1 to about 99 mole percent vinylamine and from about 99 to about 1 mole percent vinyl alcohol or N-vinylformamide.

4. The method of claim 3 wherein the vinylamine polymer is vinylamine/vinylformamide copolymer containing from about 2 to about 50 mole percent vinylamine and from about 98 to about 50 mole percent vinylformamide.

5. The method of claim 3 wherein the vinylamine polymer is vinylamine/vinyl alcohol copolymer containing from about 2 to about 90 mole percent vinyl alcohol and from about 98 to about 10 mole percent vinylamine.

6. The method of claim 1 wherein the effective amount of the vinylamine polymer is from about 0.001 to about 1000 parts per million of the wastewater treated.

7. The method of claim 6 wherein the effective amount of the vinylamine polymer is from about 0.01 to about 500 parts per million.

8. The method of claim 6 wherein the effective amount of the vinylamine polymer is from about 1 to about 250 parts per million.

9. The method of claim 1, wherein the separating is carried out by dissolved air flotation.

10. The method of claim 1, wherein the separating is carried out by using a clarifier.

11. The method of claim 1 wherein the separating is carried out by mechanical dewatering using a belt press.

12. The method of claim 1 wherein the separating is carried out by mechanical dewatering using a plate and frame press.

13. The method of claim 1 further comprising adding to the grain processing waste water a polymeric flocculant selected from the group consisting of copolymers of acrylamide and esters, amides and nitriles of (meth) acrylic acid, dimethylaminoethylacrylate methyl chloride quaternary ammonium salt, dimethylaminoethylmethacrylate methyl chloride quaternary ammonium salt, sodium 2-acrylamido-2methylpropanesulfonic acid salt, diallyldimethyl ammonium chloride, vinyl pyrrolidone and vinylsulfonate and homopolymers selected from the group consisting of polyacrylamide, polyvinylpyrrolidone, polyvinylpyridine polyvinylpyridine, polyacrylic acid, polymeric 2-acrylamido-2-methylpropanesulfonic acid, polymeric dimethylaminoethylacrylate methyl chloride quaternary ammonium salt and polymeric dimethylaminoethylmethacrylate methyl chloride quaternary ammonium salt.

* * * * *